United States Patent [19]

Filmer

[11] Patent Number: 5,470,805
[45] Date of Patent: Nov. 28, 1995

[54] GLASS COMPOSITION SUITABLE FOR USE IN ELECTRIC LAMPS, STEM MANUFACTURED FROM THIS GLASS COMPOSITION AND FLUORESCENT LAMP HAVING A LAMP ENVELOPE OF THIS GLASS COMPOSITION

[75] Inventor: Bartholomeus Filmer, Eindhoven, Netherlands

[73] Assignee: U.S. Philips Corporation, New York, N.Y.

[21] Appl. No.: 341,347

[22] Filed: Nov. 17, 1994

Related U.S. Application Data

[63] Continuation of Ser. No. 164,249, Dec. 7, 1993, abandoned.

[30] Foreign Application Priority Data

Dec. 14, 1992 [EP] European Pat. Off. .............. 92203890

[51] Int. Cl.$^6$ .......................... C03C 3/093; C03C 3/085; C03C 3/087; C03C 3/078
[52] U.S. Cl. ................... 501/55; 501/68; 501/69; 501/70; 501/72; 313/493
[58] Field of Search .................. 501/55, 68, 69, 501/70, 72; 313/493

[56] References Cited

U.S. PATENT DOCUMENTS

| | | | |
|---|---|---|---|
| 3,723,790 | 3/1973 | Dumbaugh, Jr. et al. | 313/221 |
| 3,925,089 | 12/1975 | Houben | 501/70 |
| 4,089,694 | 5/1978 | Thomas et al. | 106/53 |
| 4,337,410 | 6/1982 | Van der Geer et al. | 501/70 |
| 4,370,595 | 1/1983 | Willemsen et al. | 313/493 |
| 4,376,829 | 3/1983 | Daiku | 501/64 |
| 4,734,388 | 3/1988 | Cameron et al. | 501/70 |

FOREIGN PATENT DOCUMENTS

| | | | |
|---|---|---|---|
| 5-0144711 | 11/1975 | Japan . | |
| 58-084142 | 5/1983 | Japan | C03C 3/04 |
| 62-153143 | 7/1987 | Japan | C03C 3/095 |

*Primary Examiner*—Deborah Jones
*Attorney, Agent, or Firm*—William L. Botjer; Norman N. Spain

[57] ABSTRACT

A novel type of lead-free glass for use in glass components of electric lamps, such as stems (1) for incandescent lamps and fluorescent lamps and lamp envelopes for compact fluorescent lamps. The glass does not contain PbO, F and $B_2O_3$. The glass has favorable physical properties as regards meltability, softening, expansion, electric resistance, transparency, strength and chemical resistance.

4 Claims, 1 Drawing Sheet

GLASS COMPOSITION SUITABLE FOR USE IN ELECTRIC LAMPS, STEM MANUFACTURED FROM THIS GLASS COMPOSITION AND FLUORESCENT LAMP HAVING A LAMP ENVELOPE OF THIS GLASS COMPOSITION

This is a continuation of application Ser. No. 08/164,249 filed on Dec. 7, 1993 now abandoned.

BACKGROUND OF THE INVENTION

The invention relates to a glass composition for use in electric lamps.

The invention further relates to a stem for an electric lamp manufactured from such a glass composition.

The invention also relates to a fluorescent lamp comprising a vacuum-tight glass lamp envelope manufactured from such a glass composition.

In electric lamps, such as incandescent lamps anti fluorescent lamps, the lamp envelope generally consists of a cheap glass of the soda-lime type. However, the electric resistance of soda-lime glass is insufficient for use in the part of the lamp where the current supply conductors enter tile lamp envelope, so that leakage currents may occur in said part. Said part of the lamp is termed "stem" and comprises a glass flare, a glass exhaust tube, a glass support tool, current supply conductors, support wires and a coiled filament. Usually lead-containing glass comprising, for example, 20% by weight of PbO is used for making steins. PbO causes an increase of tile electric resistance of glass and it softens glass, which has a favorable effect on tile workability of glass.

A disadvantage of the use of PbO is its toxicity. In the preparation of lead glass, PbO is released into the atmosphere by dusting and evaporation, which is harmful to the environment and the operators. Also when lead glass is subjected to a hot working operation such as bending, moulding and fusing, PbO is released. Consequently, in order to avoid exposure to PbO the working environment has to be adapted drastically. Another disadvantage of PbO is the high cost of the raw material. A further disadvantage of PbO is the reduced light output ill compact fluorescent lamps, which is caused by evaporation followed by condensation of PbO on the fluorescent powder during hot working tile lead-containing tube glass and/or fusing the lead-containing stems. Therefore, the search for a low lead or rather lead-free glass which can be used for the manufacture of stems and which nevertheless has the desired physical properties as regards meltability, softening, expansion, electric resistance, transparency, strength and chemical resistance, has been going on for a considerable length of time.

U.S. Pat. No. 3,723,790 discloses low lead and lead-free glasses for use in electric lamps. The glass compositions described therein contain 0–8% by weight of PbO. However, the known lead-free glass compositions have a number of disadvantages. The known lead-free glass has too high a liquidus temperature ($T_{liq}$) of 888° C. The liquidus temperature is the temperature above which the glass no longer crystallizes. The lower this temperature, the smaller the risk that the glass crystallizes during the moulding process, for example the Vello process of drawing glass tubing. To lower the liquidus temperature to 837° C., 1.2% by weight of $B_2O_3$ is added to the known lead-free glass. A disadvantage of tile use of $B_2O_3$ is its high price and the agressiveness relative to the refractory material of the glass furnace. Other disadvantages of the known lead-free glass are the high content of $Li_2O$ (>1.5% by weight) and $K_2O$ (>9% by weight), as a result of which the raw materials are expensive, and the high content of BaO (>12% by weight) which leads to a substantial increase of the crystallization tendency of the glass. To the known lead-free glasses is also added an antimony-containing or arsenic-containing compound as the refining agent. However, these substances are very toxic and remain in the glass predominantly as $Sb_2O_3$ or $As_2O_3$, respectively.

SUMMARY OF THE INVENTION

It is an object of the invention to provide, inter alia, a glass composition for components of glass lamps, which glass composition is lead-free and, in addition, does not comprise the toxic component F, $As_2O_3$ and $Sb_2O_3$; which glass composition does not have the above-mentioned disadvantages and the physical properties of which are comparable to those of the known lead-containing glasses.

The invention further aims to provide a lead-free stem glass and a fluorescent lamp having a lamp envelope manufactured from such a glass composition.

According to the invention this object is achieved by a glass composition which comprises the following essential constituents, expressed in percentages by weight:

$SiO_2$ 60–72

$Al_2O_3$ 1–5

$Li_2O$ 0.5–1.5

$Na_2O$ 5–9

$K_2O$ 3–7

MgO 1–2

CaO 1–3

PHN 14.314

SrO 1–5

BaO 7–11

This glass composition does not contain the above-mentioned disadvantageous constituents PbO, $B_2O_3$, F, $As_2O_3$ and $Sb_2O_3$. In addition to a high electric resistance, a glass of this composition has other favorable properties which will be mentioned hereinafter and is very suitable for use as stem glass in electric lamps. The $SiO_2$ content of the glass according to the invention is limited to 60–72% by weight. These contents, in combination with the other constituents, lead to a readily meltable glass. $SiO_2$ serves as a network former. If the content is below 60% by weight, the cohesion of the glass and the chemical resistance are reduced. If tile content is above 72% by weight the glass formation is impeded and the risk of surface crystallization increases. $Al_2O_3$ improves the chemical resistance and the corrosion resistance of the glass. Below 1% by weight the effect is too small and the crystallization tendency of the glass increases, Above 5% by weight the viscosity and the softening temperature ($T_{soft}$) of the glass increase too much, which adversely affects the workability of the glass. The alkaline metal oxides $Li_2O$, $Na_2O$ and $K_2O$ are used as melting agent and reduce tile viscosity of the glass. If only one of said alkaline metal oxides is added the electric resistance is too low for the intended application. If all three alkaline metal oxides are used in the given composition, the electric resistance is sufficiently high (mixed-alkali effect). Below the indicated limits, $T_{soft}$ increases too much and above the indicated limits the electric resistance decreases too much. The alkaline metal oxides are also used to adapt the coefficient of expansion (α) of the glass to that of the glass of the lamp envelope (bulb) and to that of the current supply conductors. The current supply conductors generally consist of copper-coated iron-nickel wires (copper-clad wire). BaO has the favourable property that it increases the electric resistance of the glass and reduces $T_{soft}$. Below 7% by weight the melting temperature ($T_{melt}$), $T_{soft}$ and the working temperature ($T_{work}$) increase too much. Above 11% by weight the liquidus temperature ($T_{liq}$) and hence the crystallization tendency increase too much. The alkaline earth metal oxides SrO, MgO and CaO have the favourable property that they reduce $T_{liq}$ and $T_{melt}$. Below the indicated limits, $T_{liq}$ increases too much. Above the indicated limits, $T_{soft}$ increases too much.

The lead-free glass composition in accordance with the invention can be refined with $Na_2SO_4$, so that the glass may contain up to 0.1% by weight of $SO_3$. The glass may additionally contain up to 0.02% by weight of $Fe_2O_3$ as an impurity originating from the raw materials used.

By virtue of the high electric resistance and other favorable physical properties the glass composition in accordance with the invention is very suitable for the manufacture of glass components of stems for incandescent lamps and fluorescent lamps. The components in question are the flare, exhaust tube and support rod.

For certain applications extra $Fe_2O_3$ is added up to a content of 0.05% by weight. If necessary, also $CeO_2$ is added up to a content of 0.2% by weight. Such percentages serve to absorb undesired UV rays in glass for lamp envelopes of compact fluorescent lamps. These lamp envelopes are tubular and are usually bent so that they are U-shaped. By virtue of the absence of PbO in the glass, no evaporation and condensation of PbO on the fluorescent powder occurs during the bending of the tube glass at an increased temperature anti/or during fusing, the stems so that the light efficiency of the lamp is not reduced.

It is noted that U.S. Pat. No. 4,089,694 states glasses containing either PbO or the environmentally harmful and corrosive F. The known glass also contains toxic $As_2O_3$. Owing to the high $Na_2O$ content the electric resistance of the known glass without PbO is too low.

BRIEF DESCRIPTION OF THE DRAWING

The invention will be explained in greater detail by means of an exemplary embodiment and with reference to the accompanying drawings, in which FIG. 1 diagrammatically shows a perspective elevational view of a stem for an electric lamp, and FIG. 2 diagrammatically shows a cross-section of a fluorescent lamp.

DETAILED DESCRIPTION OF THE PREFERRED EMBODIMENTS

EXEMPLARY EMBODIMENT

Figure 1:
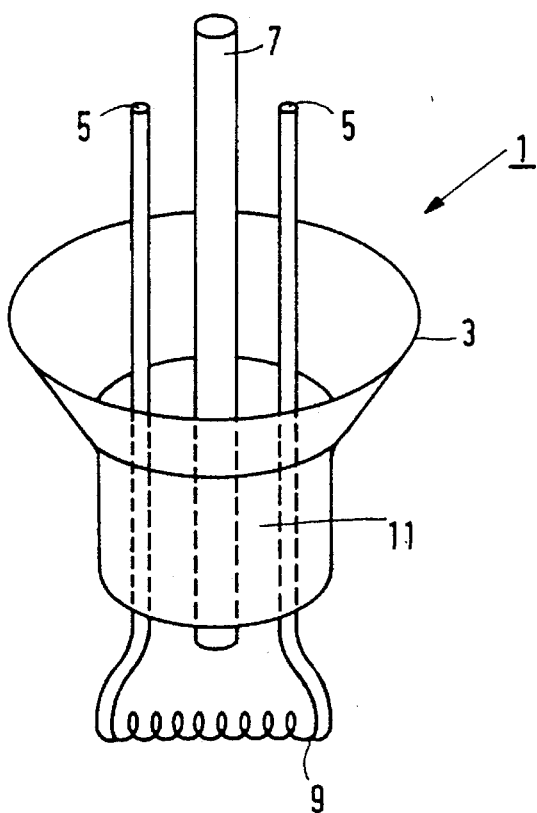

A glass composition is melted having a composition in accordance with the invention, as is indicated under "glass 1" in the following Table. The glass is melted in a platinum crucible in a gas-heated furnace. The starting materials used are quartz sand, spodumene, dolomite and the carbonates of Li, Na, K, Sr and Ba. $Na_2SO_4$ is used as the refining agent. During melting and further processing no particular problems occur. By way of comparative example, a customary lead-containing glass composition (glass 2) is shown in the Fable. The Table also includes a lead-free and $B_2O_3$-free glass composition (glass 3), as is known from Table II, example 5 of the above-mentioned U. S. Pat. No. 3,723,790.

TABLE

| | composition in wt. % | | |
|---|---|---|---|
| constituents | glass 1 according to invention | glass 2 | glass 3 |
| $SiO_2$ | 68.0 | 62.8 | 67.6 |
| $Al_2O_3$ | 3.4 | 2.1 | 3.5 |
| $Li_2O$ | 1.2 | — | 2.1 |
| $Na_2O$ | 7.4 | 6.8 | 2.2 |
| $K_2O$ | 5.0 | 7.3 | 11.4 |
| BaO | 8.7 | — | 13.3 |
| SrO | 2.9 | — | — |
| MgO | 1.3 | — | — |
| CaO | 1.9 | — | — |
| $SO_3$ | 0.1 | — | — |
| PbO | — | 20.5 | — |
| MnO | — | 0.2 | — |
| $Sb_2O_3$ | — | 0.4 | yes |
| $10^6 \cdot \alpha_{25-300}$ | 9.25 | 9.30 | 9.20 |
| $T_{strain}$ (°C.) | 450 | 410 | 445 |
| $T_{ann}$ (°C.) | 485 | 445 | — |
| $T_{soft}$ (°C.) | 675 | 635 | — |
| $T_{work}$ (°C.) | 1020 | 1000 | — |
| $T_{melt}$ (°C.) | 1490 | 1505 | — |
| $T_{k100}$ (°C.) | 290 | 285 | — |
| $T_{rho}$ (°C.) | 380 | 375 | — |
| $log(rho)_{250}$ | 8.85 | 8.6 | 10.0 |
| $log(rho)_{350}$ | 7.00 | 6.8 | — |
| $T_{liq}$ (°C.) | 840 | 800 | 888 |
| s.w. (kg/dm$^3$) | 2.62 | 2.84 | — |
| σ (mN/m) | 300 | 250 | — |

In this Table the symbols have the following meaning:

| | |
|---|---|
| $\alpha_{25:300}$ | average coefficient of expansion between 25° C. and 300° C. |
| $T_{strain}$ (°C.) | temperature at which η = (viscosity) $10^{14.5}$dPa.s, termed low stress relief temperature |
| $T_{ann}$ (°C.) | temperature at which θ = $10^{13.0}$dPa.s, termed high stress relief temperature. |
| $T_{soft}$ (°C.) | temperature at which η = $10^{7.6}$dPa.s, termed softening temperature. |
| $T_{work}$ (°C.) | temperature at which η = $10^{4.0}$dPa.s, termed working temperature. |
| $T_{melt}$ (°C.) | temperature at which η = $10^{2.0}$dPa.s, termed melting temperature. |
| rho (ohm.cm) | electric resistivity. |
| $T_{k100}$ (°C.) | temperature at which rho = $10^8$ohm.cm. |
| $T_{rho}$ (°C.) | temperature at which rho = $10^{6.52}$ohm.cm. |
| $log(rho)_{250}$ | logarithm to the base 10 of rho at 250° C. |
| $log(rho)_{350}$ | logarithm to the base 10 of rho at 250° C. |
| $T_{liq}$ (°C.) | temperature above which the glass no longer crystallizes. |
| s.w. (kg/cm$^3$) | specific mass. |
| θ (mN/m) | surface tension. |

The transmission of the glass (including reflection losses at the surface) in the range between 400 and 700 nm, measured on a 10 mm thick glass plate which is polished on both sides ranges between 87% and 91%. The glass composition in accordance with the invention (glass 1) is free of lead and has physical properties which are comparable to those of a customary lead-containing glass (glass 2). A known lead-free glass (glass 3) has an 48° C. higher liquidus temperature, as a result of which this glass has a stronger crystallization tendency. The $Li_2O$ content and, particularly, the $K_2O$ content of the known lead-free glass are relatively high. Owing to the high cost price of these constituents, the price of the known glass is increased considerably. By virtue of the high resistivity and other favourable physical properties the glass composition in accordance with the invention is very suitable for the manufacture of stems for electric lamps, such as incandescent lamps and fluorescent lamps. The glass is compatible with soda-lime glass of the lamp envelopes (bulbs) and the metals of the current supply conductors. The glass can also very suitably be used for the manufacture of lamp envelopes (bulbs) of compact fluorescent lamps because PbO, which would reduce the light output, is absent.

FIG. 1 diagrammatically shows a perspective elevational view of a stem I for an electric lamp. Said stem comprises a flare 3, current supply conductors 5 of copper-clad wire, an exhaust tube 7 and a filament 9. Flare 3 and exhaust tube 7 consist of glass having tile composition in accordance with the invention. When the lamp envelope (bulb), not shown, is provided the edge or the aperture of the lamp envelope and the edge of the flare 3 are fused together. The lamp envelope is vacuum exhausted via the exhaust tube 7 and, next, inert gas is introduced into said envelope. The exhaust tube is heated and sealed up at the location of reference numeral 11, thereby forming a vacuum-tight pinch.

Figure 2:
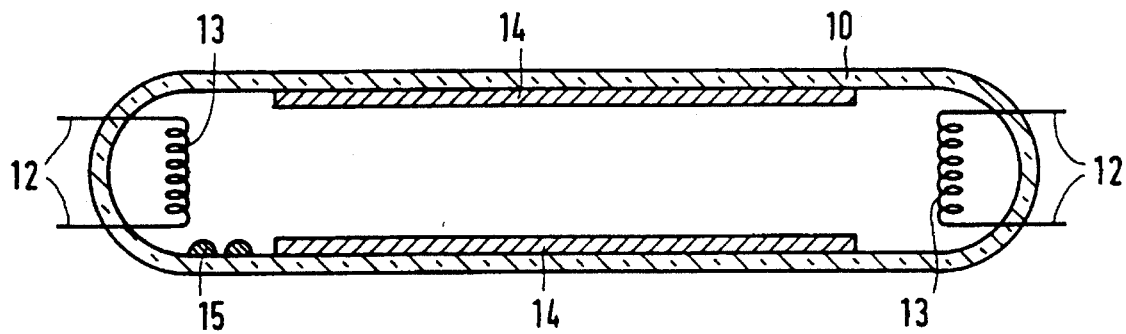

FIG. 2 diagrammatically shows a cross-section of a fluorescent lamp having a lamp envelope 10. Through the wall of the lamp envelope 10 there are provided current supply wires 12 which are connected to coiled filaments 13. A layer of a fluorescent powder 14 is present on the inner wall or the lamp envelope 10. Inside the lamp envelope 10 there is metallic mercury 15 which evaporates after switching on the lamp. Prior to sealing off, such a lamp is filled with, for example, a gas mixture of 99% by volume of Ne and 1% by volume of Ar, the overall pressure being 730 Pa. The glass of the lamp envelope 10 also contains 0.05% by weight of $Fe_2O_3$ for tile absorption of UV light. Both coiled filaments at the ends or the lamp envelope can also be provided by means of stems as shown in FIG. 1. In compact fluorescent lamps the lamp envelope 10 is bent once or several times so as to be, for example, U-shaped. By virtue of the absence of PbO, no evaporation and, hence, no condensation of PbO on tile fluorescent powder layer 14 takes place during hot working, such as the bending of the lamp envelope and the fusing of the stems, so that the light output of the lamp is not reduced.

I claim:

1. A glass composition for components of glass lamps, in which the glass consists the following essentially of constituents, expressed in percent by weight:

$SiO_2$ 60–72
$Al_2O_3$ 1–5
$Li_2O$ 0.5–1.5
$Na_2O$ 5–9
$K_2O$ 3–7
MgO 1–2
CaO 1–3
SrO 1–5
BaO 7–11.

2. A stem for an electric lamp having a glass portion, the glass portion of the stem consisting essentially of the following constituents, expressed in % by weight:

$SiO_2$ 60–72
$Al_2O_3$ 1–5
$Li_2O$ 0.5–1.5
$Na_2O$ 5–9
$K_2O$ 3–7
MgO 1–2
SrO 1–5
BaO 7–11.

3. A glass envelope for a fluorescent lamp the glass having a composition consisting essentially of the following constituents, expressed in % by weight:

$SiO_2$ 60–72
$Al_2O_3$ 1–5 $Li_2O$ 0.5–1.5
$Na_2O$ 5–9
$K_2O$ 3–7
MgO 1–2
SrO 1–5
BaO 7–11.

4. A glass composition for components of glass lamps, in which the glass consists essentially of the following constituents, expressed in percent by weight:

$SiO_2$ 60–72
$Al_2O_3$ 1–5
$Li_2O$ 0.5–1.5
$Na_2O$ 5–9
$K_2O$ 3–7
MgO 1–2
CaO 1–3
SrO 1–5
BaO 7–11
$Fe_2O_3$ 0–0.05
$CeO_2$ 0–0.2

* * * * *